United States Patent
Ghosh et al.

(10) Patent No.: US 7,617,189 B2
(45) Date of Patent: *Nov. 10, 2009

(54) PARALLEL QUERY PROCESSING TECHNIQUES FOR MINUS AND INTERSECT OPERATORS

(75) Inventors: Bhaskar Ghosh, Burlingame, CA (US); Rafi Ahmed, Fremont, CA (US); Hermann Baer, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/237,039

(22) Filed: Sep. 27, 2005

(65) Prior Publication Data

US 2007/0073642 A1    Mar. 29, 2007

(51) Int. Cl.
*G06F 7/00* (2006.01)
*G06F 17/30* (2006.01)

(52) U.S. Cl. .................. 707/3; 707/1; 707/2; 707/4; 707/5; 707/10

(58) Field of Classification Search .............. 707/1–6, 707/10
See application file for complete search history.

(56) References Cited

U.S. PATENT DOCUMENTS

| | | | |
|---|---|---|---|
| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,437,032 A | 7/1995 | Wolf et al. |
| 5,452,468 A | 9/1995 | Peterson |
| 5,495,419 A | 2/1996 | Rostoker et al. |
| 5,495,605 A | 2/1996 | Cadot |
| 5,495,606 A | 2/1996 | Borden et al. |
| 5,537,588 A | 7/1996 | Engelmann et al. |
| 5,551,027 A | 8/1996 | Choy et al. |

(Continued)

OTHER PUBLICATIONS

Xumin et al., "Using parallel semi-join reduction to minimize distributed query response time", Algorithms and Architectures for Parallel Processing, 1995. Apr. 19-21, 1995. vol. 2;p. 517-526. Download: http://ieeexplore.ieee.org/stamp/stamp.jsp?arnumber=00472236.*

(Continued)

*Primary Examiner*—Jean B. Fleurantin
*Assistant Examiner*—Hares Jami
(74) *Attorney, Agent, or Firm*—Hickman Palermo Truong & Becker LLP

(57) ABSTRACT

Various techniques are described for processing database commands that include MINUS and/or INTERSECT operators. According to one technique, the database server executes the MINUS/INTERSECT in a specialized rowsource in parallel. In one approach, the specialized rowsource implements a sort merge-join like solution, where: a DISTINCT SORT is performed on each input, a left and right pointer is maintained on the respective input streams of tuples, the left or right pointer is incremented based on whether there is a match between the tuples pointed-to by the pointers, and the tuple of the left side is returned (or not returned) based on whether there is a match. Techniques are described for generating multiple query plans for executing a query, where each of the query plans includes a plan portion for executing, in parallel, the operation associated with a MINUS/INTERSECT operator. Cost estimates are generated for the query plans. The database server selects from the query plans a particular query plan to execute based, at least in part, on the cost estimates.

20 Claims, 2 Drawing Sheets

U.S. PATENT DOCUMENTS

| | | | |
|---|---|---|---|
| 5,574,900 | A | 11/1996 | Huang et al. |
| 5,590,319 | A | 12/1996 | Cohen et al. |
| 5,675,791 | A | 10/1997 | Bhide et al. |
| 5,710,915 | A | 1/1998 | McElhiney |
| 5,822,748 | A | 10/1998 | Cohen et al. |
| 5,832,477 | A | 11/1998 | Bhargava et al. |
| 5,848,408 | A | 12/1998 | Jakobsson et al. |
| 5,857,180 | A * | 1/1999 | Hallmark et al. ............... 707/2 |
| 5,905,981 | A * | 5/1999 | Lawler .......................... 707/4 |
| 5,918,225 | A | 6/1999 | White et al. |
| 5,924,088 | A | 7/1999 | Jakobsson et al. |
| 5,974,408 | A | 10/1999 | Cohen et al. |
| 6,067,542 | A * | 5/2000 | Carino, Jr. ..................... 707/4 |
| 6,289,334 | B1 * | 9/2001 | Reiner et al. .................. 707/3 |
| 6,370,524 | B1 | 4/2002 | Witkowski |
| 6,438,558 | B1 | 8/2002 | Stegelmann |
| 6,438,562 | B1 | 8/2002 | Gupta et al. |
| 6,510,422 | B1 | 1/2003 | Galindo-Legaria et al. |
| 6,535,874 | B2 | 3/2003 | Purcell |
| 6,615,203 | B1 | 9/2003 | Lin et al. |
| 6,618,719 | B1 | 9/2003 | Andrei |
| 6,622,138 | B1 | 9/2003 | Bellamkonda et al. |
| 6,665,664 | B2 | 12/2003 | Paulley et al. |
| 6,684,203 | B1 | 1/2004 | Waddington et al. |
| 6,792,420 | B2 | 9/2004 | Stephen Chen et al. |
| 6,801,905 | B2 | 10/2004 | Andrei |
| 6,941,360 | B1 | 9/2005 | Srivastava et al. |
| 7,146,360 | B2 | 12/2006 | Allen et al. |
| 7,467,128 | B2 | 12/2008 | Larson et al. |
| 2002/0038313 | A1 | 3/2002 | Klein et al. |
| 2003/0055814 | A1 | 3/2003 | Chen et al. |
| 2003/0120825 | A1 | 6/2003 | Avvari et al. |
| 2004/0220923 | A1 | 11/2004 | Nica |
| 2005/0033730 | A1 | 2/2005 | Chaudhuri et al. |
| 2005/0055382 | A1 | 3/2005 | Ferrat et al. |
| 2005/0076018 | A1 * | 4/2005 | Neidecker-Lutz ............... 707/3 |
| 2005/0149584 | A1 * | 7/2005 | Bourbonnais et al. ....... 707/204 |
| 2005/0198013 | A1 | 9/2005 | Cunningham et al. |
| 2005/0283471 | A1 | 12/2005 | Ahmed |
| 2006/0041537 | A1 | 2/2006 | Ahmed |
| 2006/0167865 | A1 | 7/2006 | Andrei |
| 2006/0218123 | A1 * | 9/2006 | Chowdhuri et al. ............ 707/2 |
| 2007/0027880 | A1 | 2/2007 | Dettinger et al. |
| 2007/0073643 | A1 | 3/2007 | Ghosh et al. |
| 2007/0192283 | A1 | 8/2007 | Larson et al. |

OTHER PUBLICATIONS

Srivastava et al., "Optimizing multi-joint queries in parallel relational databases", Parallel and Distributed Information Systems, 1993., Jan. 20-22, 1993. p. 84-92. Download: http://ieeexplore.ieee.org/stamp/stamp.jsp?arnumber=00253067.*

Oracle, "Oracle 9I Database Documentation", Oracle, Parts A96670-01, A96674-01, A96673-02, 2002, 833 pages.

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

German Patent Office, "Office Action," GR App. No. P4479320.9-53, dated Dec. 22, 2005 (5 pages), with English translation (4 pages).

Current Claims, GR App. No. P4479320.9-53, 9 pages (attached).

Borla-Salamet, Pascale, "Compiling Control into Database Queries for Parallel Execution Management," IEEE Conference on Parallel Distributed Information Systems, 1991, ISBN 0-8186-2295-4, pp. 271-279.

Bergsten, et al., "Prototyping DBS3 a Shared-Memory Parallel Database System", IEEE, 226-234, 1991.

Bride, Anupam "An Analysis of Three Transaction Processing Architectures", Computer Science Division, UC Berkeley, 1998, pp. 339-350.

Copeland, George et al., "Data Placement in Bubba," MCC, 1988, pp. 99-108.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, May 1989, pp. 1-23.

Hirano, et al., "Load Balancing Algorithm for Parallel Processing on Shared Memory Multiprocessor ", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Graefe, Goetz, "Encapsulation of Parallelism in the Volcano Query Processing System," Mar. 1990, pp. 102-111.

Leverenz et al., "Oracle 8i Concepts Release 8.1.5", Oracle Corporation, Feb. 1999, located on the internet at <http://www.csee.umbc.edu/help/oracle8/server.815/a67781/toc.htm>, 121 pages.

Stonebraker, Michael, et al. "The Design of XPRS,", et al., EECS Department UC Berkeley, 1988, pp. 318-330.

Tandem, "A Benchmark of NonStop SQL on the Debit Credit Transaction", The Tandem Performance Group, 1988, pp. 337-341.

Chen, et al., "View merging in the context of view selection changing", Database Engineering and Applications Symposium 2002, Proceedings, Jul. 2002, 10 pages.

\* cited by examiner

PARALLEL QUERY PROCESSING TECHNIQUES FOR MINUS AND INTERSECT OPERATORS

RELATED APPLICATIONS

The present application is related to U.S. patent application Ser. No. 10/874,400, entitled "Multi-Tier Query Processing" filed by Rafi Ahmed on Jun. 22, 2004, the content of which is incorporated herein by reference.

The present application is also related to U.S. patent application Ser. No. 11/237,040, entitled "MULTI TIERED QUERY PROCESSING TECHNIQUES FOR MINUS AND INTERSECT OPERATORS", filed by Bhaskar Ghosh, Rafi Ahmed, Hermann Baer on Sep. 27, 2005, the content of which is incorporated herein by reference.

FIELD OF THE INVENTION

The present invention relates to databases and, more specifically, to query processing techniques for queries that contain MINUS and INTERSECT operators.

BACKGROUND

A join is a query that combines rows from two or more sources, such as tables, views, or snapshots. In the context of database systems, a join is performed whenever multiple tables appear in a query's FROM clause. The query's select list can select any columns from any of the base tables listed in the FROM clause.

An equijoin is a join with a join condition containing an equality operator. An equijoin combines rows that have equivalent values for the specified columns. Query1 is an equijoin that combines the rows of tables R and S where the value in column r.b is the same as the value in column s.b:

| QUERY1 |
|---|
| SELECT * |
| FROM R, S |
| WHERE r.b = s.b; |

For the purpose of illustration, assume that tables R and S contain the following rows:

| TABLE R | |
|---|---|
| a | B |
| W | A |
| X | A |
| Y | B |
| Z | C |

| TABLE S | |
|---|---|
| a | B |
| 1 | A |
| 2 | C |
| 3 | C |
| 4 | D |

Under these circumstances, Query 1 would produce the result set:

| R. a | R. b | S. a | S. b |
|---|---|---|---|
| W | A | 1 | A |
| X | A | 1 | A |
| Z | C | 2 | C |
| Z | C | 3 | C |

In this example, two rows ((W, A) and (X, A)) in table R combine with row (1, A) in row S. Therefore, row (1, A) appears twice in the result set. Similarly, row (Z, C) in table R combines with two rows ((2, C) and (3, C)) in table S. Therefore, row (Z, C) appears twice in the result set. Row (Y, B) of table R does not combine with any row in table S, so row (Y, B) is not reflected in the result set of the equijoin. Similarly, row (4, D) of table S did not combine with any row in table R, so row (4, D) is not reflected in the result set of the equijoin.

An equijoin is an example of a binary operation that produces a result multi-set (a multi-set is a collection of items that allows non-distinct items) based on the contents of two multi-set sources. Other binary SQL operations that produce result set based on two multi-set sources are minus and intersect. Each of these operations shall be described in greater detail hereafter.

Minus

A minus operation returns all of the distinct elements of one multi-set (the "left-hand source") that do not match any values in another multi-set (the "right hand source"). Thus, column R.b minus column S.b would produce the result set (B), because B is the only value in R.b that does not match with any value in S.b. Significantly, even if R.b has the value "B" in several rows, the result set of the minus operation would only include a single "B", because minus operations only return distinct values (i.e. no duplicates).

Intersect

An intersect operation returns all of the distinct elements in one multi-set (the "left-hand source") that are also contained in another multi-set (the "right-hand source"). Thus, column R.b intersect column S.b would produce the result set (A, C), because A and C are the values in R.b that match values in S.b. Significantly, even though C matches two rows in S.b, only one C is included in the result set because intersect operations only return distinct values.

Minus and Intersect Operations

MINUS and INTERSECT are commonly used set operators in the Structured Query Language ("SQL") that is supported by most database servers. MINUS and INTERSECT operators have been adopted in ANSI SQL for the last ten years, and every major database vendor offers support of the MINUS and INTERSECT operators in some form or another. A common strategy for performing the MINUS/INTERSECT operations involves, for example, performing a sort-merge join and a sort-merge anti-join, respectively.

In data-warehouses with reporting applications, set operators are usually evaluated on very large sets of data, so it is critical to make the set operations, such as MINUS and INTERSECT, scale in any SQL execution engine. Based on the foregoing, it is desirable to provide techniques that handle MINUS/INTERSECT operations more efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An approach to handling MINUS and INTERSECT queries is described herein. In the approach, the original query is not transformed. Instead, the database server employs various parallelization techniques to efficiently execute the MINUS and/or INTERSECT operations.

Correlated Subqueries

A "correlated subquery" is a subquery that refers to one or more sources that are not in the FROM list of the subquery. For example, the following query (Q4) includes a subquery, where the FROM list includes T2 and T4, but includes WHERE clauses that also refer to T1.

| Q4. |
|---|
| SELECT T1.X |
| FROM T1 |
| WHERE EXISTS (SELECT T2.Y |
| FROM T2, T4 |
| WHERE T2.x = T4.x and T2.Z = T1.Z |
| MINUS |
| SELECT T3.K |
| FROM T3, T5 |
| WHERE T3.f = T5.f and T3.D = T1.D); |

When MINUS appears inside a correlated subquery, it may not be possible to convert the set operator into anti-join, because it would need to be transformed into correlated views on the left and right of anti-join. The query Q4 shows an example where the MINUS operator cannot be converted into anti-join.

If it is not possible and/or efficient to process MINUS/INTERSECT operations by transforming the queries using the techniques described herein, MINUS/INTERSECT operations may still be performed efficiently using the alternative approach described hereafter.

Parallel Execution of Minus/Intersect Operations

According to one embodiment, if a database server chooses not to perform the transformation techniques described herein (for reasons of cost, complexity or correctness), then the database server executes the MINUS/INTERSECT in a specialized rowsource in parallel. The slaves that perform the MINUS/INTERSECT operations associated with the specialized rowsource are referred to herein as the MINUS/INTERSECT slaves.

According to one embodiment, the specialized rowsource implements a sort merge-join like solution, where:

- a DISTINCT SORT is performed on each input,
- a left and right pointer is maintained on the respective input streams of tuples,
- the left or right pointer is incremented based on whether there is a match between the tuples pointed-to by the pointers, and
- the tuple of the left side is returned (or not returned) based on whether there is a match.

For example, assume that the database server receives the following query:

| |
|---|
| SELECT c1 |
| FROM T1 |
| INTERSECT |
| SELECT c1 |
| FROM T2 |

Figure 1:
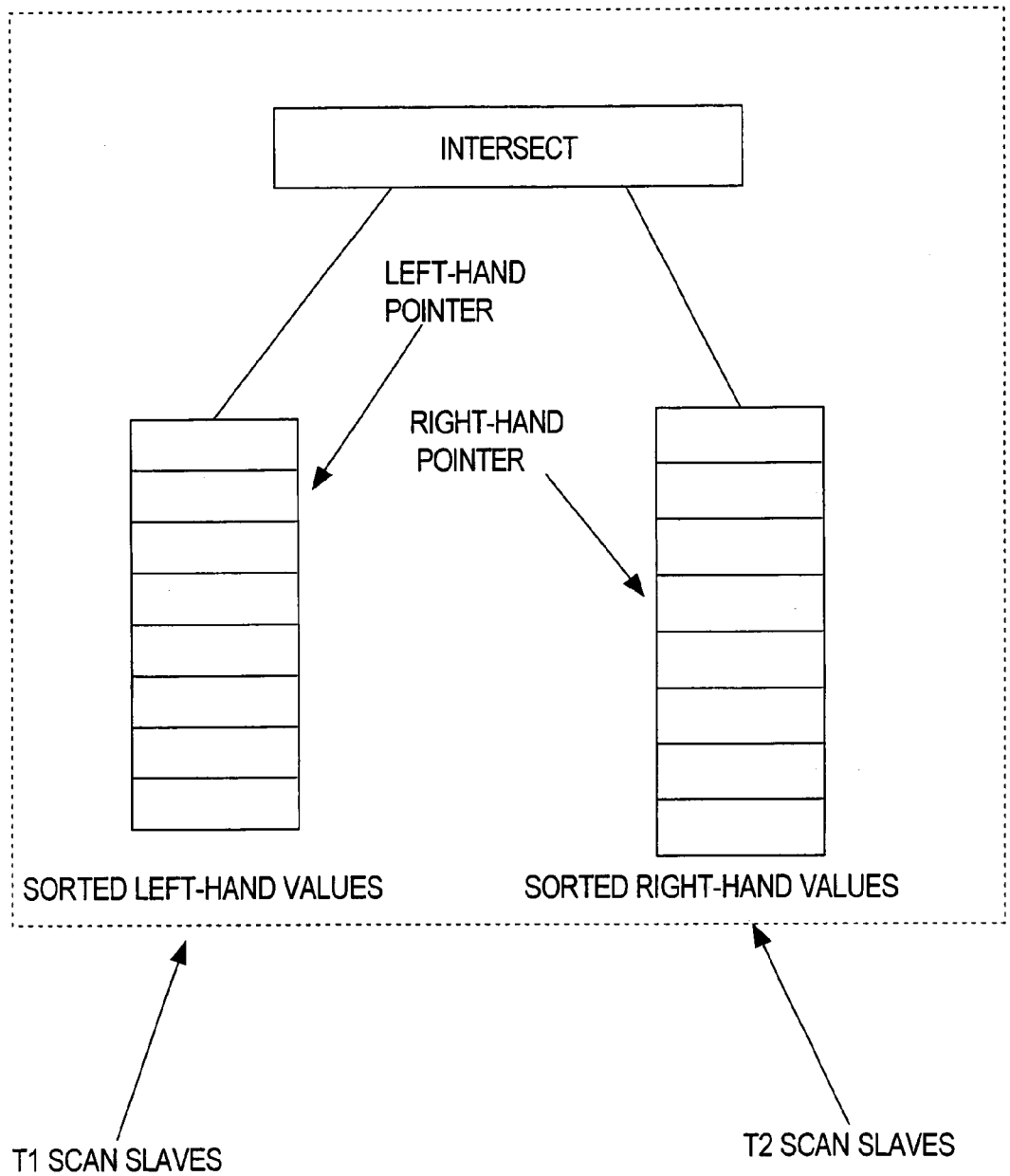
FIG. 1 is a block diagram that illustrates work performed by a MINUS/INTERSECT slave, according to one embodiment of the invention.

This query selects all distinct values from column c1 of T1 that match any values in column c1 of T2. Referring to FIG. 1, it is a block diagram of the work performed by an INTERSECT slave that participates in execution of this query, according to one embodiment. As illustrated, the INTERSECT slave receives values from coil of T1, and values from col2 of T2. Typically, the INTERSECT slave would receive these values from slaves assigned to scan T1 and T2, respectively.

The INTERSECT slave sorts the values from T1, and eliminates any duplicates therein, to produce a buffer of sorted left-hand values. Similarly, the INTERSECT slave sorts the values from T2 to produce a buffer of sorted right-hand values.

The INTERSECT slave then sets a left-hand pointer to point to the start of the buffer of sorted left-hand values. The INTERSECT slave also sets a right-hand pointer to point to the start of the buffer of sorted right-hand values. The value located at the buffer location indicated by the left-hand pointer is referred to as the current left-hand value. Similarly, the value located at the buffer location indicated by the right-hand pointer is referred to as the current right-hand value.

The INTERSECT slave compares the values at the current pointer locations against each other. If the current left-hand value matches the current right hand value, then the left hand value is returned and both pointers are incremented to point to the next values in their respective buffers. If the current left-hand value is greater than the current right-hand value, then the right-hand pointer is incremented to point to the next value in the buffer of sorted right-hand values. If the current left-hand value is less than the current right-hand value, then the left-hand pointer is incremented to point to the next value in the buffer of sorted left-hand values.

A MINUS slave operates in a similar manner, with the difference that the MINUS slave only returns left-hand values that do not match any right-hand values. Specifically, for MINUS slaves, if the current left-hand value matches the current right hand value, then both pointers are incremented without returning any value. If the current left-hand value is greater than the current right-hand value, then the right-hand pointer is incremented to point to the next value in the buffer of sorted right-hand values. If the current left-hand value is less than the current right-hand value, then the left-hand value is returned and the left-hand pointer is incremented to point to the next value in the buffer of sorted left-hand values.

Cost-Based Selection of Minus/Intersect Rowsource Operation

When MINUS/INTERSECT slaves are used to perform a MINUS/INTERSECT operation, the efficiency of the MINUS/INTERSECT operation may vary based on how values are distributed to MINUS/INTERSECT slaves. With respect to the distribution of values to MINUS/INTERSECT slaves, several variations are possible. According to one embodiment, costs are estimated for each of several parallelization plans, and the database server selects the parallelization plan based, at least in part, on the cost estimates.

According to one embodiment, the different parallel plans considered by the database server are illustrated below as PP1_hash_hash, PP2_right_broadcast, and PP3_right_serial.

Parallelization Using Hash/Hash Redistribution

The PP1_hash_hash plan is illustrated as follows:

PP1_hash_hash:

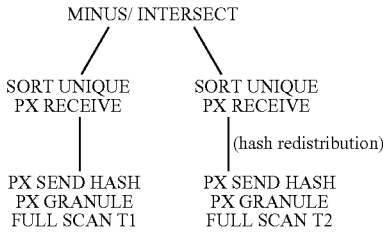

In the PP1_hash_hash plan, there are three DFOs: one for reading table T1 and hash distributing the values of T1 to the MINUS/INTERSECT slaves, one for reading table T2 and hash distributing the values of T2 to the MINUS/INTERSECT slaves, and one for the MINUS/INTERSECT operation. In this example, each input is redistributed by hash (C1) to the set MINUS/INTERSECT slaves. Specifically, the scan slaves for table T1 redistribute by hash (T1.C1) to the MINUS/INTERSECT slaves, while the scan slaves for table T2 redistribute by hash (T2.C1) to the MINUS/INTERSECT slaves.

While hash distribution is used in this example, it should be noted that any value-based redistribution is possible, so long as value-based redistribution guarantees that every tuple with the same value (C1) ends up on the same MINUS/INTERSECT slave. Thus, the database server can use RANGE redistribution instead of HASH redistribution. When HASH redistribution is used, both sets of scan slaves must use the same hash function. When RANGE redistribution is used, both sets of scan slaves must use the same range boundaries during the redistribution.

Parallelization Using Right Broadcast Redistribution

The PP1_right_broadcast plan is illustrated as follows:

PP2_right_broadcast:

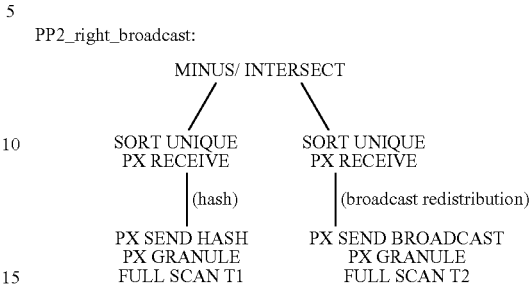

The right input (from table T2) is broadcast to the MINUS/INTERSECT slaves, and the left input is redistributed using value-based distribution (e.g. hash redistribution). Similar to the PP1_hash_hash plan, the PP2_right_broadcast may be carried out by three slave sets: one slave set to read and redistribute values from T1, one slave set to read and broadcast values from T2, and one slave set to perform the MINUS/INTERSECT operation.

Because the right-hand source is broadcast (all MINUS/INTERSECT slaves receive input from all rows of T2), the overhead associated with applying a hash function to the values of T2 is avoided. The overhead associated with applying the hash function may be significant, for example, when the MINUS/INTERSECT function selects many columns. Consequently, under some circumstances, avoiding the application of the hash function to values of T2 may more than compensate for the added overhead of having each of the MINUS/INTERSECT slaves read and sort the entire right-hand table.

Parallelization Using Right Serial Distribution

In the PP1_right_broadcast plan, the entire right-hand table is redistributed to each MINUS/INTERSECT slave. Because this involves no right-hand redistribution, two slave sets may be used to achieve similar results. One slave set reads table T1 and redistributes the values of T1 using a value-based distribution. Each slave in the other slave set (1) scans the entire table T2, (2) performs the sort unique on the entire table T2, (3) performs the sort unique on the T1 values it receives from the T1 scan slaves, and (4) performs the MINUS/INTERSECT between its sorted set of T1 values and the entire right-hand table (table T2). The PP3_right_serial plan, which involves a "virtual broadcast" of the right-hand values, is illustrated as follows:

PP3_right_serial:

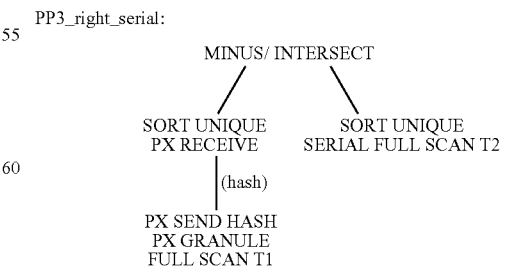

The left input partitioning can be inherited if it is value-based (i.e. hash or range) on the columns in the select list of the MINUS/INTERSECT operator (or a prefix thereof). That is, if the partitioning is such that every input row with the same value of C1 ends up on the same MINUS/INTERSECT slave, then the partitioning may be inherited and no additional input redistribution is required. This is further elaborated upon hereafter, in the section entitled CLUMPING/CLUSTERING.

Strength Reduction

The MINUS/INTERSECT operation is often performed on a large number of columns (C1, C2, C3, ... Ck). If plan PP1_hash_hash is chosen, then the overhead of computing the hash function during redistribution of rows can be large. The database server can get around this problem at compilation time or execution time by performing the hash-based (or range-based) redistribution based on values from a subset of those columns. However, it the wrong subset of columns are chosen, the tuple-to-slave redistribution may be skewed. For example, there may be ten MINUS/INTERSECT slave processes, and distributing based on C1 alone may cause 90% of the rows to be distributed to one of the ten MINUS/INTERSECT slaves.

According to one embodiment, the subset is selected based on statistics maintained by the database about values contained in the columns involved in the MINUS/INTERSECT operation. Specifically, the database server may choose the number of redistribution to be a subset where p<k such that the number of unique values of the tuples (C1, C2, C3, ..., Cp) is a multiple of the degree of parallelism (DOP) that is large enough to ensure that each slave gets enough rows, and there is relatively little skew. Thus, if a single column involved in the MINUS/INTERSECT operation has a sufficient number of unique values, that column alone may be selected as the hash key for performing the redistribution. Even when redistribution is performed on a subset of the columns, the left and right input sorts still have to compute the distinct on the entire list columns (C1, C2 ..., Ck) since that is required for correctness of the MINUS/INTERSECT operation.

Clumping/Clustering

Clumping generally involves grouping neighboring row sources to encapsulate or define a connected component of the plan tree which will be executed on a single slave process as a single piece. Clumping is used by the database server to define DFOs. When two neighboring row sources in the plan tree are not clumped together, they belong to different DFOs (i.e., there is a DFO boundary between them).

Parallel MINUS/INTERSECT fits into the clustering/clumping model in the same way as Table Functions, described in U.S. patent application Ser. No. 11/204,409, entitled "Communication Optimisations for Parallel Table Functions", filed on Aug. 15, 2005 by Bhaskar Ghosh, the content of which is incorporated herein by reference.

In general, the database server may "clump" row sources within a plan tree to reduce communication cost by avoiding redistribution inside a parallel query plan.

(a) Clumping with Parent:

A child row source may be clumped with a parent row source if the parent row source requires input that has a particular characteristic (such as a particular grouping or ordering), and the child row source produces output that has the required characteristic. In the present example, the MINUS/INTERSECT row source requires input that reflects a value-based distribution based on all or a subset of the columns involved in the MINUS/INTERSECT operation. Consequently, if the row source below the MINUS/INTERSECT row source produces output that is value-based distributed in that manner, then the MINUS/INTERSECT row source may be clumped with that child row source.

For example, assume that the plan P2_hash_hash is chosen, and there is an ORDER BY on the columns (c1,c2). For example the query looks like:

```
SELECT * FROM (
SELECT c1, c2 FROM T1
MINUS
SELECT c1, c2 FROM T2
)
ORDER BY c1, c2;
```

Under these circumstances, the ORDER BY can be removed, since the left input and MINUS output ordering is also c1, c2. The input table queues have to be changed from HASH to RANGE to make sure global ordering takes place, and the final plan looks like:

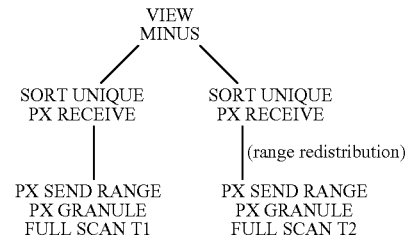

(b) Clumping with Child:

The MINUS/INTERSECT row source produces output that reflects a value-based distribution based on all or a subset of the columns involved in the MINUS/INTERSECT operation. Consequently, if the row source above the MINUS/INTERSECT row source requires input that is value-based distributed in that manner, then the MINUS/INTERSECT row source may be clumped with that parent row source.

For example, if the plan P2_hash_hash is chosen, and one input is already value partitioned on (c1, c2), then input redistribution into the SORT+MINUS slaves is not needed. For a query like:

```
SELECT c1, c2
FROM T1
GROUP BY c1, c2
HAVING sum(c3) > 100000
MINUS
SELECT c1, c2
FROM T2
GROUP BY c1, c2
HAVING sum(c3) > 100000;
```

The clumped plan will look like:

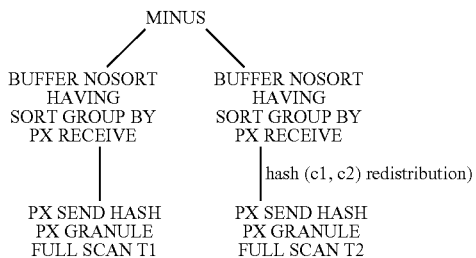

The same slave performing the group-by on (c1, c2), and filtering via the HAVING clause, will perform the MINUS. The SORT UNIQUE will be transformed into a BUFFER NOSORT because the SORT GROUP BY rowsource has already sorted the data and produced unique values of (c1, c2).

Hardware Overview

Figure 2:
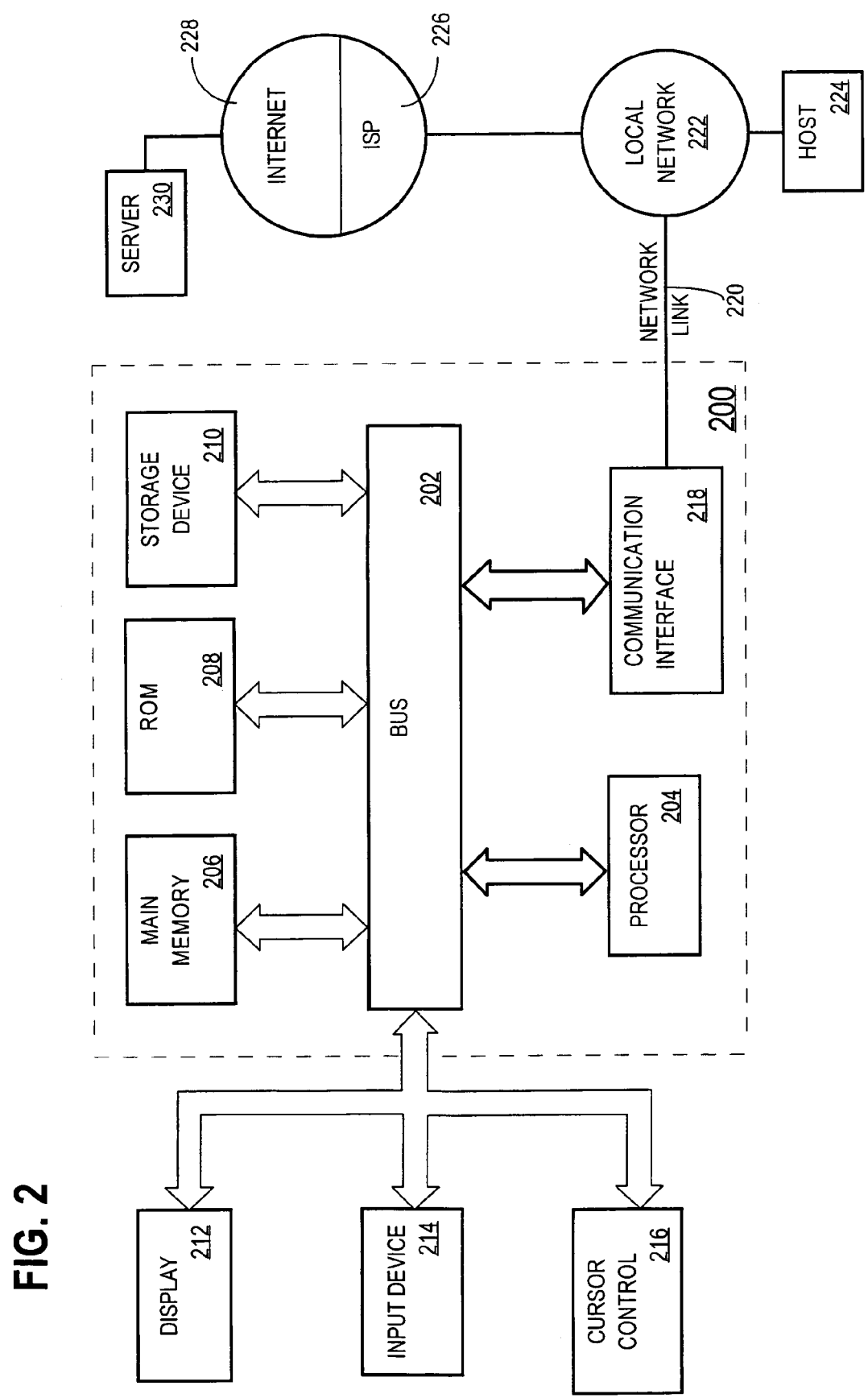
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media, which includes non-volatile media, volatile media, and non-storage media, such as transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include storage media such as a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or transmission media such as a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-executed method comprising the steps of:
    receiving a query that includes a particular operator,
        wherein the particular operator is one of MINUS and INTERSECT;
        wherein, within the query, the operands to the particular operator include a left-hand source and a right-hand source;
    determining that the particular operator appears inside a correlated subquery within the query;
    based on the step of determining that the particular operator appears inside the correlated subquery, determining not to transform the query into another query that has an operator that is different from the particular operator;
    based on the step of determining not to transform the query into another query that has an operator that is different from the particular operator, performing the steps of:
        generating a plurality of query plans for executing said query, wherein a portion of each of the query plans includes a parallelization plan for executing the operation associated with said particular operator, and wherein the respective parallelization plan for each query plan of said plurality of query plans is different than the parallelization plan of any other query plan of said plurality of query plans;
        generating cost estimates for the query plans in said plurality of query plans; and
        selecting from said plurality of query plans a particular query plan to execute based, at least in part, on the cost estimates,
    wherein each of said steps of said method is performed by one or more computing devices.

2. The method of claim 1 wherein the operation associated with said operator is an operation in which each slave process of a set of slave processes receives a subset of values from the left-hand source, wherein the subset of values received by each slave process from the left-hand source is determined by a value-based distribution of the left-hand source.

3. The method of claim 2 wherein the operation represented by said parallelization plan indicates that each slave process of a set of slave processes:
    sorts values from said left-hand source in a first buffer;
    sorts values from said right-hand source in a second buffer; and
    returns values from the first buffer based on whether the values match any values in the second buffer.

4. The method of claim 1 wherein:
    the plurality of query plans includes a query plan that involves a first set of slave processes, a second set of slave processes, and a third set of slave processes;
    the first set of slave processes is assigned to perform the operation associated with said particular operator;
    the second set of slave processes redistributes values from the left-hand source to the first set of slave processes using value-based redistribution; and
    the third set of slave processes redistributes values from the right-hand source to the first set of slave processes using value-based redistribution.

5. The method of claim 1 wherein:
    the plurality of query plans includes a query plan that involves a first set of slave processes, a second set of slave processes, and a third set of slave processes;
    the first set of slave processes is assigned to perform the operation associated with said particular operator;
    the second set of slave processes redistributes values from the left-hand source to the first set of slave processes using value-based redistribution; and
    the third set of slave processes broadcasts values from said right-hand source to slave processes in the first set of slave processes so that each slave process in the first set of slave processes receives all values from said right-hand source.

6. The method of claim 1 wherein:
    the plurality of query plans includes a query plan that involves a first set of slave processes and second set of slave processes;
    each slave process of the first set of slave processes is assigned to perform a full scan of the right-hand source and to perform the operation associated with said particular operator; and
    the second set of slave processes redistributes values from the left-hand source to the first set of slave processes using value-based redistribution.

7. The method of claim 2 wherein:
    the operation associated with the operator returns values from a plurality of columns of the left-hand source; and
    the value-based redistribution is performed based on a subset of the plurality of columns.

8. The method of claim 7 wherein the instructions further include instructions for:
    maintaining statistics for one or more columns of said plurality of columns; and
    selecting said subset of columns based on said statistics.

9. The method of claim 1 wherein the instructions further comprise instructions for:
    performing a comparison between input requirements of said portion of said query plan and output characteristics of another portion of the query plan; and
    determining whether to clump said portion of said query plan with said other portion of the query plan based on said comparison.

10. The method of claim 1 wherein the instructions further comprise instructions for:

performing a comparison between output characteristics of said portion of said query plan and input requirements of another portion of the query plan; and determining whether to clump said portion of said query plan with said other portion of the query plan based on said comparison.

11. A machine-readable storage medium carrying one or more sequences of instructions which, when executed by one or more processors, causes the one or more processors to perform the method recited in claim 1.

12. A machine-readable storage medium carrying one or more sequences of instructions which, when executed by one or more processors, causes the one or more processors to perform the method recited in claim 2.

13. A machine-readable storage medium carrying one or more sequences of instructions which, when executed by one or more processors, causes the one or more processors to perform the method recited in claim 3.

14. A machine-readable storage medium carrying one or more sequences of instructions which, when executed by one or more processors, causes the one or more processors to perform the method recited in claim 4.

15. A machine-readable storage medium carrying one or more sequences of instructions which, when executed by one or more processors, causes the one or more processors to perform the method recited in claim 5.

16. A machine-readable storage medium carrying one or more sequences of instructions which, when executed by one or more processors, causes the one or more processors to perform the method recited in claim 6.

17. A machine-readable storage medium carrying one or more sequences of instructions which, when executed by one or more processors, causes the one or more processors to perform the method recited in claim 7.

18. A machine-readable storage medium carrying one or more sequences of instructions which, when executed by one or more processors, causes the one or more processors to perform the method recited in claim 8.

19. A machine-readable storage medium carrying one or more sequences of instructions which, when executed by one or more processors, causes the one or more processors to perform the method recited in claim 9.

20. A machine-readable storage medium carrying one or more sequences of instructions which, when executed by one or more processors, causes the one or more processors to perform the method recited in claim 10.

* * * * *

UNITED STATES PATENT AND TRADEMARK OFFICE
CERTIFICATE OF CORRECTION

PATENT NO. : 7,617,189 B2                                                         Page 1 of 1
APPLICATION NO. : 11/237039
DATED           : November 10, 2009
INVENTOR(S)     : Bhaskar Ghosh et al.

It is certified that error appears in the above-identified patent and that said Letters Patent is hereby corrected as shown below:

On the Title page, in Item (75), in column 1, in "Inventors", line 1, delete "Burlingame, CA (US)" and insert -- Palo Alto, CA (US) --, therefor.

In column 1, line 13, delete ""MULTI TIERED" and insert -- "MULTI-TIERED --, therefor.

Signed and Sealed this

Seventeenth Day of August, 2010

David J. Kappos
*Director of the United States Patent and Trademark Office*